(12) United States Patent
Clines et al.

(10) Patent No.: US 11,467,363 B1
(45) Date of Patent: Oct. 11, 2022

(54) MID-SPAN FIBER BREAKOUT (71) Applicant: PREFORMED LINE PRODUCTS CO., Mayfield Village, OH (US)

(72) Inventors: Cameron Clines, Chagrin Falls, OH (US); Dan Levac, Gahanna, OH (US); Matt Becker, University Heights, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 17/343,999

(22) Filed: Jun. 10, 2021

(51) Int. Cl.
*G02B 6/44* (2006.01)
(52) U.S. Cl.
CPC ................ *G02B 6/4459* (2013.01)
(58) Field of Classification Search
CPC .................................................. G02B 6/4459
See application file for complete search history.

(56) References Cited

U.S. PATENT DOCUMENTS

| | | | | |
|---|---|---|---|---|
| 6,466,725 | B2 * | 10/2002 | Battey | G02B 6/4473 385/100 |
| 6,619,697 | B2 * | 9/2003 | Griffioen | F16L 41/023 285/126.1 |

* cited by examiner

*Primary Examiner* — Ellen E Kim
(74) *Attorney, Agent, or Firm* — Cooper Legal Group, LLC; William J. Cooper (57) ABSTRACT

A breakout device for mid-span fiber separation. First and second portions that each have a hollow interior space that defines a first part of a primary interior pathway and that defines a first part of a secondary interior pathway that branches away from the primary pathway. The first and second portions together bound the primary and secondary pathways. The first and second portions together define: a first entrance orifice, a second exit orifice and a third exit orifice. The first and second portions are configured to permit in-situ placement of the device upon elongated fibers. All the fibers extend through the first entrance orifice at the entrance to the primary pathway, a first group of the fibers extend through the second exit orifice at an exit from the primary pathway, and a second group of the fibers extend through the third exit orifice at an exit from the secondary pathway.

20 Claims, 8 Drawing Sheets

MID-SPAN FIBER BREAKOUT

TECHNICAL FIELD

The present disclosure is directed towards separating elongate fibers at a mid-span location. For example, the present disclosure is directed towards breaking-out some fibers away from a remainder of the grouped fibers within a fiber cable.

BACKGROUND

Elongate fibers, such as optical fibers, are often provided as a group within a fiber cable. Often, separation of some fibers from the overall group is desired. Fibers can be damaged. As such, protection of the fibers may be beneficial. Fiber protection may be provided by structures that envelope the fibers. At a location of separation of fibers from a group, protection of the fibers is to be provided for fibers extending in multiple directions.

Typically, a fiber performs better when splice of the fiber is avoided. Also, time and cost are associated with a fiber splice.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a breakout device for mid-span fiber separation. The device includes a first portion that has a hollow interior space that defines a first part of a primary interior pathway and that defines a first part of a secondary interior pathway that branches away from the primary interior pathway. The device includes a second portion that has a hollow interior space that defines a second part of the primary interior pathway and that defines a second part of the secondary interior pathway. The first and second portions together bound the primary interior pathway and bound the secondary interior pathway. The first and second portions together define a first entrance orifice into the device at an entrance to the primary interior pathway, a second exit orifice from the device at an exit from the primary interior pathway, and a third exit orifice from the device at an exit from the secondary interior pathway. The first and second portions are configured to permit in-situ placement of the device upon elongated fibers at a mid-span location of the fibers, with the fibers extending through the first entrance orifice at the entrance to the primary interior pathway, a first group of the fibers extending through the second exit orifice at the exit from the primary interior pathway, and a second group of the fibers extending through the third exit orifice at the exit from the secondary interior pathway.

In accordance with one or more aspects, the present disclosure provides a breakout device for mid-span fiber separation. The device includes a first portion having an interior space defining a first part of a primary interior pathway and defining a first part of a secondary interior pathway that branches away from the primary interior pathway. The device includes a second portion having an interior space defining a second part of the primary interior pathway and defining a second part of the secondary interior pathway, wherein the first portion and the second portion are movable relative to one another between a mated configuration and an unmated configuration. The device includes a mating member on at least one of the first portion or the second portion to retain the first and second portions in the mated configuration. In the unmated configuration the first and second portions are configured to permit in-situ placement of the device upon elongated fibers at a mid-span location of the fibers, wherein the fibers are disposed within a portion of the primary interior pathway and a subset of the fibers are disposed in the secondary interior pathway and branch away from the portion of the primary interior pathway. In the mated configuration the fibers are retained within the device.

In accordance with one or more aspects, the present disclosure provides a breakout device for mid-span fiber separation. The device includes a first portion having an interior space defining a first part of a primary interior pathway and defining a first part of a secondary interior pathway that branches away from the primary interior pathway. The device includes a second portion having an interior space defining a second part of the primary interior pathway and defining a second part of the secondary interior pathway, wherein the first portion and the second portion are movable relative to one another between a mated configuration, in which fibers are retained within the device, and an unmated configuration, in which the first and second portions permit in-situ placement of the device upon the fibers. The device includes an anti-pinch configuration to guide the fibers away from a pinch condition between the first portion and the second portion as the first portion and the second portion are moved from the unmated configuration to the mated configuration.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

It is to be appreciate that, in one or more examples, the present disclosure provides a breakout device for mid-span fiber separation. The device includes a first portion that has a hollow interior space that defines a first part of a primary interior pathway and that defines a first part of a secondary interior pathway that branches away from the primary interior pathway. The device includes a second portion that has a hollow interior space that defines a second part of the primary interior pathway and that defines a second part of the secondary interior pathway. The first and second portions together bound the primary interior pathway and bound the secondary interior pathway. The first and second portions together define a first entrance orifice into the device at an entrance to the primary interior pathway, a second exit orifice from the device at an exit from the primary interior pathway, and a third exit orifice from the device at an exit from the secondary interior pathway. The first and second portions are configured to permit in-situ placement of the device upon elongated fibers at a mid-span location of the fibers, with the fibers extending through the first entrance orifice at the entrance to the primary interior pathway, a first group of the fibers extending through the second exit orifice at the exit from the primary interior pathway, and a second group of the fibers extending through the third exit orifice at the exit from the secondary interior pathway.

Figure 1:
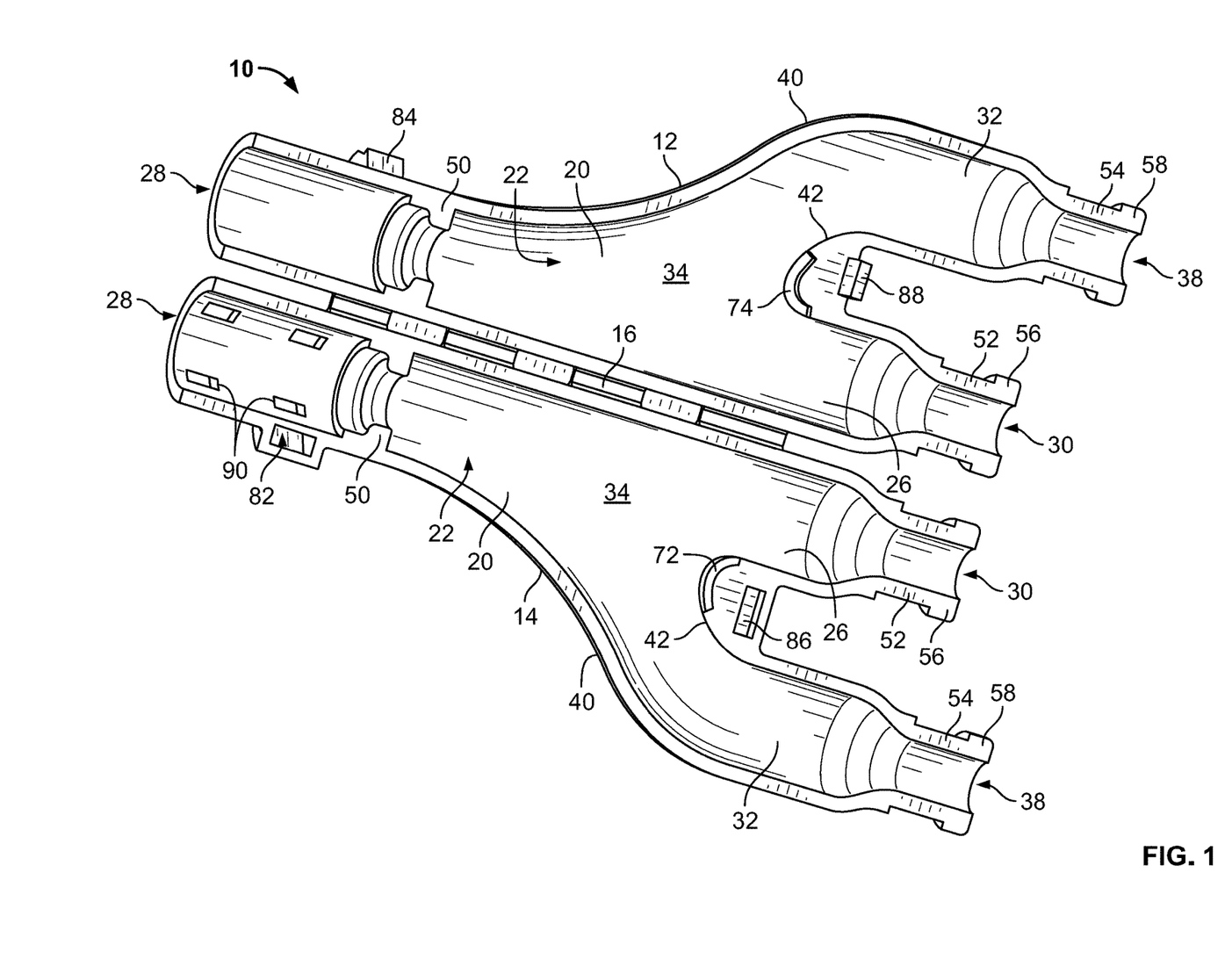
FIG. 1 is a perspective view illustration of a first example of a breakout device for mid-span fiber separation, with the device being in a first, undeployed or unmated (e.g., open) position or configuration, according to some embodiments.

Referring to FIG. 1, an example of a breakout device 10 for mid-span fiber separation is shown. It is to be noted that the device 10 is shown in a first, undeployed position within FIG. 1. The example device 10 has a clamshell configuration. Specifically, the example device 10 has a first half 12 and a second half 14. The first and second halves 12, 14 are portions of the device 10. The first and second halves 12, 14 are connected to each other via a hinge 16. Within the shown example the hinge 16 is provided by a series of flexible hinge segments (e.g., four segments in the shown example). Of course, a different hinge construction is contemplated. It is to be noted that anything contemplated concerning variations to various structures, features, aspects or the like is within the scope of this disclosure.

Within one or more examples, the device 10 is made of hard plastic, with the hinge 16 being sufficiently thin to permit a hinge movement (e.g., folding) thereat. Of course, different materials, and combinations of materials are contemplated.

The first half 12 has a general "Y" shape. Also, the first half 12 includes a wall 20 that separates a hollow interior space 22 from an exterior of the first half. The wall 20 is shaped such that the wall is concave toward the hollow interior 22 and convex (see FIG. 2) toward the exterior of the first half 12. Note that the hollow interior 22 is hidden in FIG. 2, and as such the reference numeral is associated with a dash lead line to indicate the hidden condition in FIG. 2.

The first half 12 has a primary wall segment 26 that extends along a generally linear direction with a first open end 28 of the wall 20 and a second open end 30 of the wall located at opposite ends of the primary wall segment 26. The first half 12 has a secondary wall segment 32 that junctions from, and thus branches from, the primary wall segment 26 at a junction location (or simply a "junction") 34 that is partially along the extent of the primary wall segment between the first and second open ends 28, 30. The secondary wall segment 32 includes at least one curve and extends to a third open end 38 of the wall 20. The junction 34 between the primary wall segment 26 and the secondary wall segment 32 includes a smoothly arcuate portion 40, generally nearest to the first open end 28, with the smoothly arcuate portion including a transition from an outwardly facing concave shape to an outwardly facing convex shape. The junction 34 between the primary wall segment 26 and the secondary wall segment 32 includes another smoothly arcuate portion 42, generally nearest to the second and third open ends 30, 38, with the smoothly arcuate portion 42 having an outwardly facing concave shape.

Focusing upon the first open end 28 of the wall 20, such first open end is intended to receive a fiber cable 46 (see FIG. 3) that contains a plurality of elongate fibers 48. So, all of the fibers 48 of the fiber cable 46 extend into and through the first open end 28. Within one or more examples, the fibers 48 are optical fibers. However, it is to be appreciated that each fiber may be of any type, construction, etc., and that each fiber may provide for conduction of any type of transmission (e.g., light, electricity, etc.). As such, the specifics of the fibers 48 need not be specific limitations upon the present disclosure. Also, the specifics of the cable 46 (e.g., sheathing, bundling, non-fiber members such as a strength member, etc.), need not be specific limitations upon the present disclosure.

Turning back to FIG. 1 note that the shown example includes structure(s) at/near the first open end 28 of the wall 20 that is/are associated with reception of the fiber cable 46 therein. Within the shown example such structure includes a reducer 50 to help hold, retain, align, or the like the fiber cable 46/fibers 48 received within the first open end 28. The example reducer 50 is a thicken wall portion that reduces an interior diameter of the hollow interior space 22 and thus reduces the interior hollow space diameter at the reducer. Within the shown example, the reducer 50 is a stepped-down reducer, which includes a plurality of different thickness to provide a plurality of different reductions of interior diameter of the hollow interior space 22 and thus different reductions of the interior hollow space at each respective different thickness. Such a stepped-down reducer 50 helps to accommodate a range of different diameters that can be associated with different cables.

Focusing upon the second and third open ends 30, 38 of the wall 20, within the shown example each of such ends 30, 38 is associated a reduced diameter wall portion 52, 54, respectively, and a thickened wall portion 56, 58, respectively, at each respective distal end. The thickened wall portion 56, 58 at each respective distal end may be considered to be a collar. Such may be best viewed within FIG. 2.

At this point, it is to be noted that the second half 14 (e.g., the second clamshell half) includes similar, albeit mirror image, structures concerning the wall 20: concave toward the hollow interior 22, the primary wall segment 26, the secondary wall segment 32 that extends from the junction 34, the first-third open ends 28, 30 and 38, structures at the first-third open ends, and the respective shapes, configurations, locations, etc. Hereinafter, discussions regarding at least the structures mentioned above are to be considered to apply to both the first and second halves 12 and 14 (e.g., the first and second clamshell halves).

Focusing upon one similar, albeit mirror image, structure, it is to be noted that the first and second halves 12 and 14 each have a hollow interior space 22. Each of such hollow interior spaces 22 can be considered to be portions (e.g., first and second portions) of an overall hollow interior space when the first and second halves 12 and 14 are closed (e.g., mated together and thus placed in a deployed position as discussed further following).

At this point, it is to be noted that there are some different structures that are present on the first and second halves 12, 14, with these different structures being discussed further following.

Turning again to FIG. 3, which shows the example device 10 in an example use environment, note that some structure(s) of the fiber cable 46 has/have been removed at the device 10, e.g., beginning at a location that is adjacent to the first open end 28. The structure(s) removed from the fiber cable 46 may include sheathing, bundling materials, non-fiber members such as a strength member, etc. It is noted that some additional, optional items are provided, such optional items are a buffer material wrap 64 and connectors 66 (e.g., zip-ties). Such additional items may be located at a point of removal of the structure(s) (e.g., sheathing) from the fiber cable 46 and may be located adjacent to the first open end 28.

Figure 3:
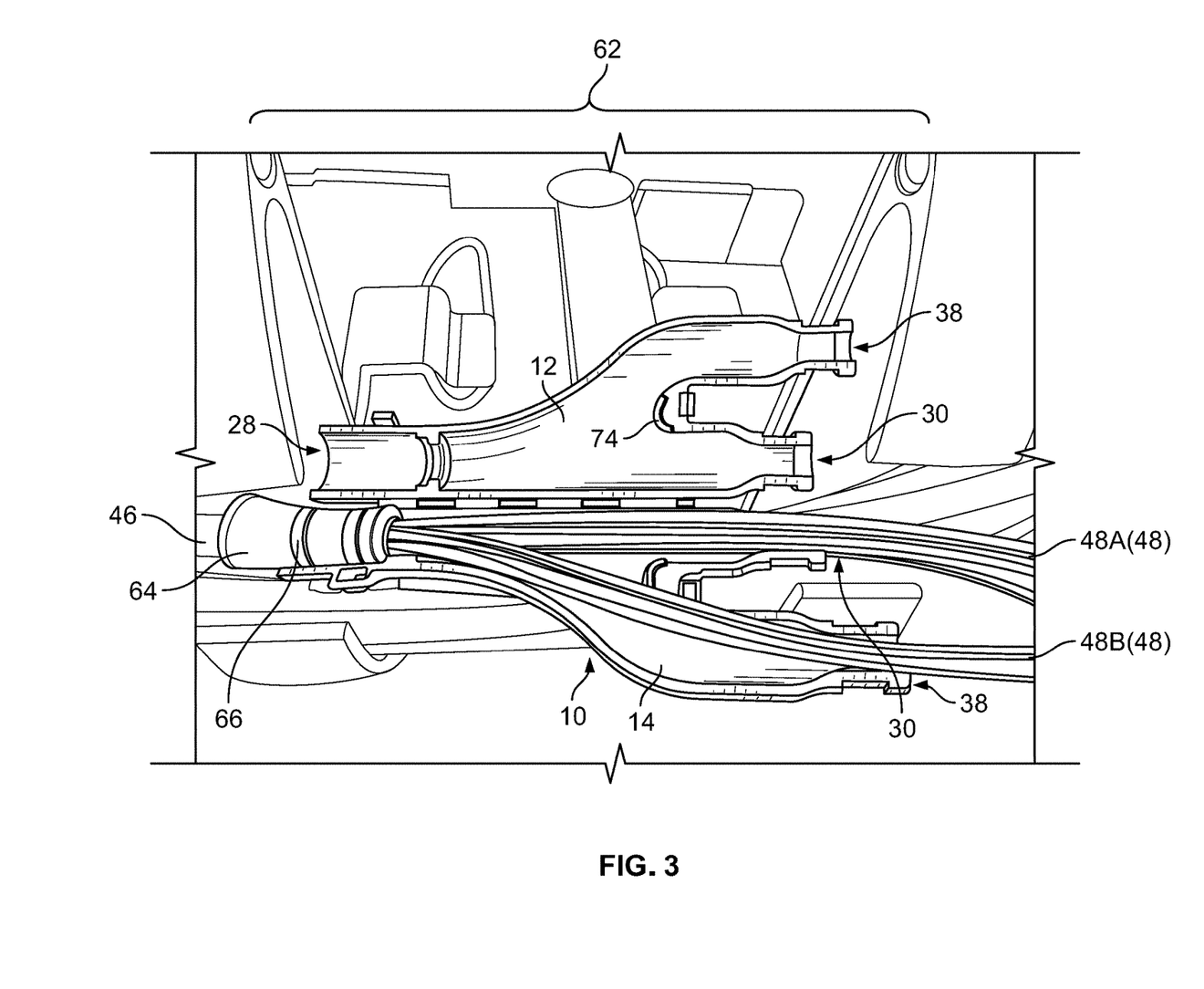
FIG. 3 is an illustration of the first example device of FIG. 1 in the first, undeployed or unmated (e.g., open) position or configuration and an example fiber cable, with both shown within an example environment, with some example fibers being separated out to provide two example fiber subgroups, with each of the two subgroups being located within respective portions of the first example device of FIG. 1, according to some embodiments.

FIG. 3 shows a condition (e.g., an undeployed, open condition) of the device 10 that permits operation (e.g., manipulation) upon the cable 46 and the fibers 48 of the cable. It is to be noted that the fibers 48 are not cut, and thus not spliced back together, at the segment of the fibers shown within FIG. 3. It is to be recalled that the fibers 48 are elongate. Also, it is to be recalled that cutting/splicing, if done, may have undesirable aspects, such as the reduction of fiber performance and the time/cost involved with splicing.

Within FIG. 3, note that the fibers 48 of the fiber cable 46 are separated such that some 48A (e.g., a first subset of fibers) extend along the primary wall segment 26 that extends along a generally linear direction from the first open end 28 to the second open end 30. As such, the first subset of fibers 48A is provided within a primary interior pathway in the hollow interior 22 between the first and second open ends 28, 30. Recall that each of the first and second halves 12, 14 provides a portion of the overall hollow interior 22. As such, each of the first and second halves 12, 14 provides a part (e.g., first and second parts) of the primary interior pathway. As can be appreciated, once the two halves 12, 14 are closed to mate together (e.g., deployed) the two parts (e.g., first and second parts) of the primary interior pathway are together to provide the primary interior pathway and the first subset of fibers 48A extend along the primary interior pathway. As such, the primary wall segments 26 of the first and second halves 12, 14 bound the primary interior pathway when the two halves 12, 14 are closed to mate together (e.g., deployed). It is to be noted that the first subset of fibers 48A are to extend out through the second open end 30 of the device 10.

Note that some other fibers 48B (e.g., a second subset of fibers) are to extend along the secondary wall segment 32, via a slight change of direction and an associated slight bend of the respective fibers (e.g., the second subset of fibers 48B) at the junction 34, to extend toward, and eventually out through, the third open end 38. These "other" fibers of the second subset 48B, now separated, may be identified by any suitable identifier/name, and similarly the first subset 48A may be identified by any suitable identifier/name. For example, the second subset fibers 48B (e.g., proceeding to/though the third open end) could be identified as a "dwelling" or "building" group of fibers, and the first subset of fibers 48A (e.g., proceeding to/though the second open end) could be identified as the "remainder." Of course, other identifiers could be used.

Please note that as shown within FIG. 3, the second subset 48B of fibers, although already separated, are not yet fully seated into the secondary wall segment 32 (e.g., a small segment is up away from the wall segment and not yet fully placed into the hollow interior 22). It is to be appreciated that full seating will be accomplished and that the device 10 will be fully deploy (e.g., closed via the flex bending of the hinge 16) to respectively enclose each of the two separated subset groups 48A, 48B. Such full deployment (e.g., closure) is shown within FIG. 4.

As such, the second subset of fibers 48B is provided with a secondary interior pathway in the hollow interior 22 between the first and third open ends 28, 38. Recall that each of the first and second halves 12, 14 provides a portion of the overall hollow interior 22. As such, each of the first and second halves 12, 14 provides a part (e.g., first and second parts) of the secondary interior pathway. As can be appreciated, once the two halves 12, 14 are closed (e.g., deployed) the two parts (e.g., first and second parts) of the secondary interior pathway are together to provide the secondary interior pathway and the second subset of fibers 48B extend along the secondary interior pathway. As such, an initial portion (e.g., near the first open end 28) of the primary wall segments 26 and the secondary wall segments 32 bound the secondary interior pathway when the two halves 12, 14 are closed (e.g., deployed).

It is to be appreciated that with cable 46/fibers 48 (48A/48b) in place and with the two halves 12, 14 are closed (e.g., deployed), the first open ends 28 provide a first, entrance orifice into the device at an entrance to the primary interior pathway for all fibers 48 to enter, the second open ends 30 provide a second, exit orifice from the connector at an exit from the primary interior pathway for some fibers 48A to exit and the third open ends 38 provide a third, exit orifice from the connector at an exit from the secondary interior pathway for some other fibers 48B to exit. Also, because the fibers 48 (48A/48b) are not cut/spliced for the purpose of placing the fibers into the device 10 and deploying the device onto the fibers, the placement is in-situ (e.g., in place) placement of the device onto the fibers to accomplish the separation and protection of the separated fibers. Thus to be clear, the in-situ placement is without a need of cutting/splicing the fibers 48. Recall that the fibers 48 have an elongation span and the placement of the device is at a mid-span location of the fibers. With the in-situ placement of the device 10, all fibers 48 extend through the first, entrance orifice at the entrance to the primary interior pathway, a first group of fibers 48A extend through the second, exit orifice from the connector at the exit from the primary interior pathway and a second, separate group of fibers 48B extending through the third, exit orifice from the connector at the exit from the secondary interior pathway.

It is worth noting that the clamshell construction (e.g., first and second halves 12, 14 connect via the hinge 16) of the device 10 is an example configuration that permits the in-situ placement of the device upon elongated fibers. The first and second halves 12, 14 mate together such that the interior space 22 is enclosed and the primary and secondary interior pathways are thereby bounded.

Figure 4:
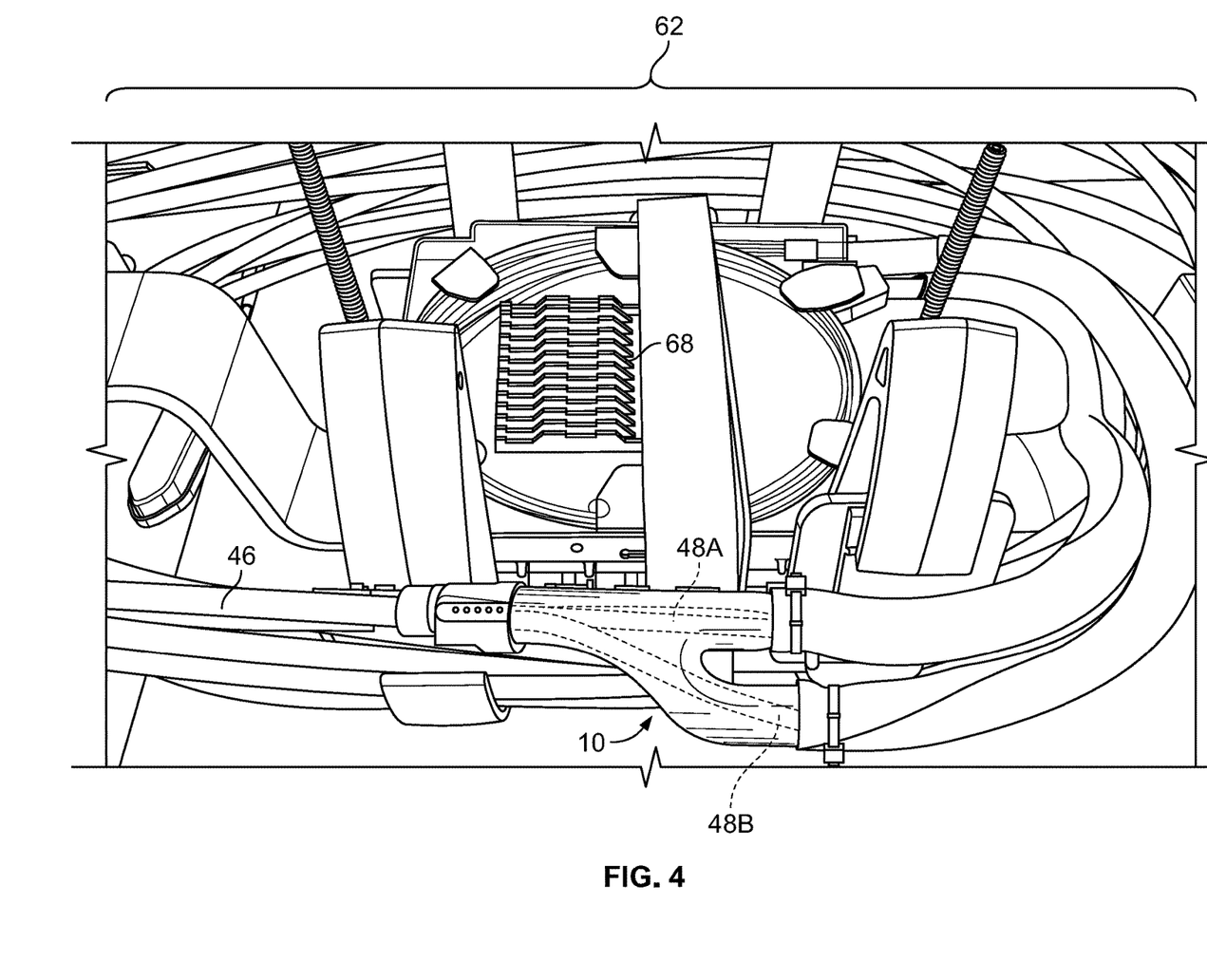
FIG. 4 is an illustration similar to FIG. 3, but with the first example device of FIG. 1 in a deployed or mated (e.g., closed to mate together) position or configuration enveloping a portion of the fiber cable and the fiber subgroups, with ancillary structures provided to help protect the fiber cable and the fiber subgroups and secure the example device in the deployed position or configuration, according to some embodiments.

There may be one or more reasons to separate the fibers 48 (e.g., a subset from a remainder, which may be termed a "breakout"). For example, there may be a need to utilize (e.g., connect, terminate, etc.) the second subset of fibers 48B (e.g., the "dwelling" or "building" group of fibers) at a location. Note that FIGS. 3 and 4 shown structures 62 at an example location to which the fiber cable 46 extends and at which the example device 10 is utilized. Specifically, the example location is a housing (not shown to permit viewing of other structures 62, but to be understood as enclosing the other, shown structures) that may be located at a building, dwelling or the like (not shown) and which encloses one or more splice trays 68, slack baskets and/or other relevant structures/devices. It is to be appreciated that internal volume space within the housing is limited. As such, efficient utilization of space is useful. Further, space on/adjacent to splice trays 68 or the like is limited and efficient utilization of space on/adjacent to splice trays is useful. In general, tray or slack storage space used for breakouts reduces capacity for tray and splice count within a housing of given internal space volume.

Note that FIGS. 3 and 4 show that the device 10, which separates the second subset of fibers 48B (e.g., the "breakout") from the remainder 48A, is located away from the splice trays 68, etc. As such, it is to be appreciated that only the second subset of fibers 48B, and not the remainder 48A of the fibers, may be further routed to a particular spot, structure, etc. within the housing. An example of such particular spot, structure, etc. is the splice tray(s) 68. As such, the remainder 48A of the fibers do not take up space at/near that particular spot (e.g., the splice trays 68).

Also, it is to be noted that the separated subset of fibers 48B (e.g., "breakout") and the remainder 48A are easily separately routed to different areas within the housing, for different uses and/or different destinations, including destinations back outside of the housing. As an example, the separated subset of fibers 48B (e.g., the "breakout") may be terminated and spliced to other structures (e.g., communication devices, other fibers, etc.) and the remainder of fibers 48A may be routed back out of the housing toward some other location (e.g., some other, different housing with similar structures).

Within one or more examples, the example device 10 can be used within an apex loop within the housing that encloses the various structures 62, including splice trays 68. Such use of the device 10 may thus utilize previously unused space within the enclosure and/or conserve other space within the enclosure.

With the above discussion understood concerning the separation of the fibers 48 into the two subsets 48A, 48B and respectively guided the two subsets to the second and third open ends 30, 38 of the device 10, some other additional, optional structures of the device, functions of the device, and surrounding structures are presented following.

Within the example shown in FIGS. 1-4, it is to be noted that the extension, at the junction 34, of the secondary wall segment 32 away from the primary wall segment 26 may include smooth, arcuate surfaces. Such smooth, arcuate surfaces may be useful and/or beneficial for use with some fibers. For example, such smooth, arcuate surfaces may help guide some fibers for separation with a reduced risk of fiber damage.

Focusing upon FIGS. 1 and 3, which show the device 10 in an open condition (e.g., the condition permitting the separation/manipulation of the fibers 48 and prior to closing to retain and protect the separated fibers), note that the second half 14 may include a tab projection 72 located adjacent to smoothly arcuate portion 42 and within a crotch of the "Y" shape. When the device is in the non-deployed (e.g., open) position, the tab projection 72 extends out, so as to be above other device structures, as compared to remainder of the second half 14. Within the shown example, the tab projection 72 is curved to follow along a portion of the smoothly arcuate portion 42.

A complementary receptacle 74 is located adjacent to the smoothly arcuate portion 42 of the first half 12 and which also is located within the crotch of the "Y" shape. The complementary receptacle 74 receives the tab projection 72 when the device 10 is in the closed condition (e.g., the two halves 12, 14 are mated together, via the bending of the hinge 16, as shown in FIG. 4.). Within the shown example (FIGS. 1 and 3), the complementary receptacle 74 is shaped to receive the projection 72 therein.

The tab projection 72 may help to guide the separated, second subset of fibers 48B away from the remainder 48A while the device 10 is open or at least not fully closed. Also, the tab projection 72 may help to retain the separation during closing motion of the device 10. Still further, the tab projection 72 may help to prevent pinching of any fibers during closing motion of the device 10, and thus serve as an anti-pinch configuration. Even further, the tab projection 72 may help to prevent damage to a fiber during closing motion of the device 10. It is to be appreciated that a tab projection is but one type of anti-pinch configuration and any number and/or types of anti-pinch configurations are contemplated herein (e.g., angled, flared, sloped, etc. protrusion, flange, etc.).

Figure 2:
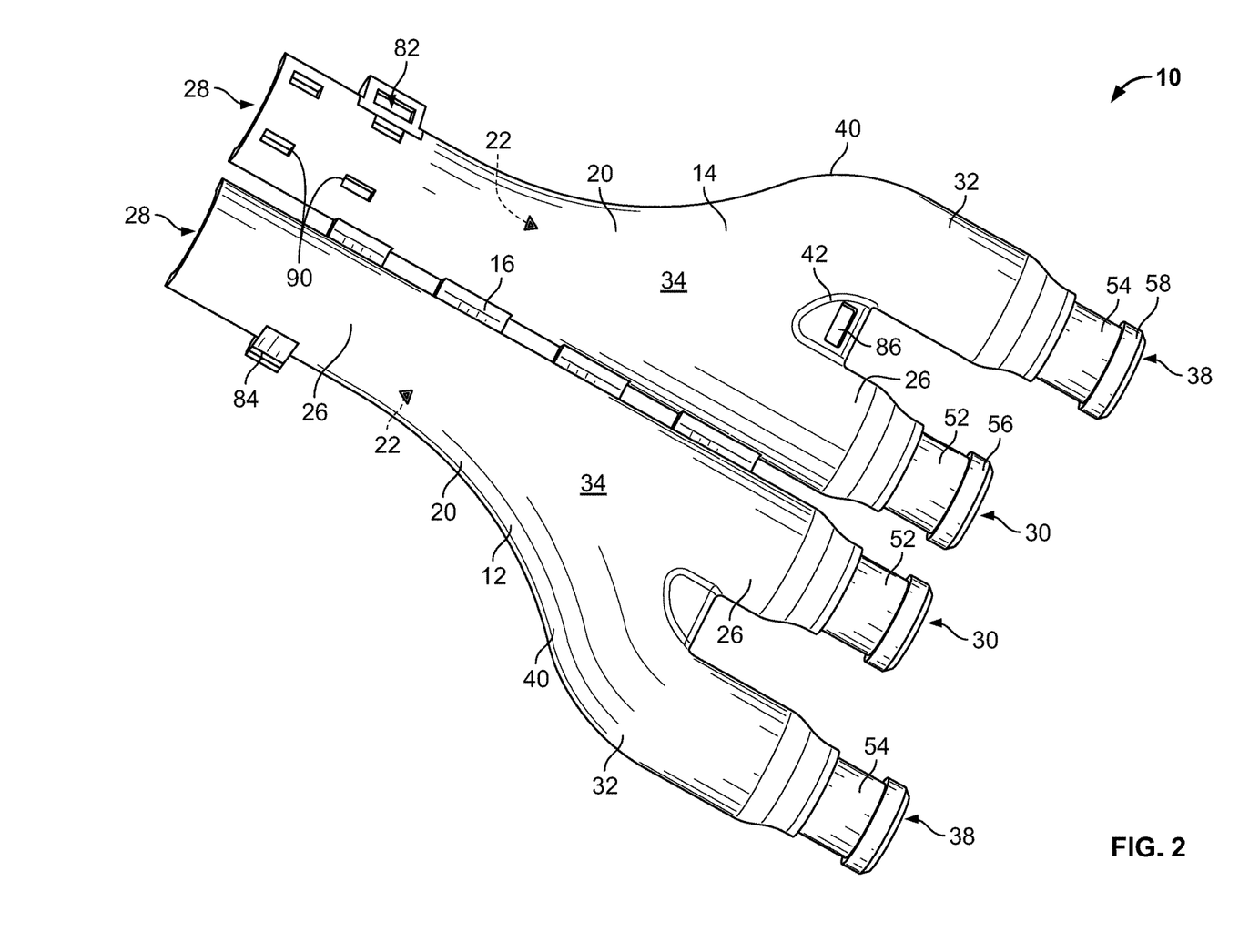
FIG. 2 is a reverse side perspective view illustration of the example device of FIG. 1, according to some embodiments.

Focusing upon FIGS. 1 and 2, note that device 10 may include one or more closure retainers or mating members. Within the shown example, each closure retainer is a snap clasp that includes a receptacle on one of the device halves and a mating clasp projection on the other half. Within the shown example, two snap clasps are shown, with one located near the first open end 28 and a second located within the crotch of the "Y" shape.

Focusing upon the snap clasp near the first open end 28, note that the example includes a portion located on the second half 14 that bounds a receptacle 82, and includes a portion that is a barbed projection 84 on the first half 12. When the device 10 is closed (e.g., the hinge 16 is flexed to bring the two halves 12, 14 together), the projection 84 enters the receptacle 82. Within the receptacle 82, a barb on the projection 84 is slightly squeezed. Once the projection 84 is moved into the receptacle 82 a sufficient amount, the barb on the projection 84 is moved to point in which the barb moves past the portion bounding the receptacle 82 and "snaps" out to an un-squeezed condition. The barb helps hold the projection 84 in the receptacle 82 and thus helps hold the device 10 in the closed position. It is to be appreciated that a snap clap is but one type of mating member and any number and/or types of mating members are contemplated herein to maintain one or more potions of a device in a mated, closed, deployed, etc. condition, configuration, position, etc.

Focusing upon the snap clasp within the crotch of the "Y" shape, note that the example includes a portion located on the second half 14 that bounds a receptacle 86, and includes a portion that is a barbed projection 88 on the first half 12. When the device 10 is closed (e.g., the hinge 16 is flexed to bring the two halves 12, 14 together), the projection 88 enters the receptacle 86. Within the receptacle 86, a barb on the projection 88 is slightly squeezed. Once the projection 88 is moved into the receptacle 86 a sufficient amount, the barb on the projection 88 is moved to point in which the barb moves past the portion bounding the receptacle 86 and "snaps" out to an un-squeezed condition. The barb helps hold the projection 88 in the receptacle 86 and thus help hold the device 10 in the closed position.

As yet another optional structural feature, note that tie receptacles, for receiving zip-ties or the like, may be provided. The shown example includes tie receptacles 90 located near the first open end 28 on the second half 14 of the device 10. Within the shown example, four tie receptacles 90 are provided. Of course, different location(s) and/or different numbers of tie receptacles 90 could be provided. It is to be appreciated that ties (e.g., zip-ties) could be inserted therethrough to retain/hold the cable 46. Such may be useful to help retain/hold the cable 46 relative to the second half 14 of the device 10, such as during manipulation of the cable 46 and/or the fibers 48. Such may be useful to help retain/hold the cable 46 relative to the device 10 once the device is closed.

It is to be appreciated that optional structures, material, wrap, etc. may be applied to the cable 46 and/or the device 10 at/adjacent to the first open end 28. Examples of such include tape, closed-sell foam and shrink wrap. The use of such may help retain the cable 46 relative to the device 10. Also, the use of such may help protect the cable 46 and/or the device 10.

Recall that the reduced diameter wall portions 52, 54 and the associated thickened wall portions 56, 58 (collars) are at the second and third open ends 30, 38, respectively. Although, such structures may be optional, such structures may provide some useful functions. Within one or more examples, the reduced diameter wall portions 52, 54, as bounded at the respective distal ends, provides an area to which ties/retainers (e.g., zip-ties) may be applied. Attention is directed to FIG. 4, which shows an example of cloth shrouds enveloping/surrounding the respective subsets of fibers 48A, 48B. Each cloth shroud is wrapped around a length of each respective group of fibers 48A, 48B as those fibers are routed toward a respective destination. The shrouds may provide protection (e.g., from injury, dirt, etc.) to the enveloped fibers. Note that the shrouds are retained in position relative to the device 10, and thus relative to the enveloped fibers via example zip ties that are positioned and tightened onto the respective reduced diameter wall portions 52, 54. The associated thickened wall portions 56, 58 (collars) prevent removal of the zip ties along respective elongation axes at the second and third open ends 30, 38 of the device 10.

It is contemplated and thus to be understood that other variants of example configurations that permit in-situ placement of the device mid-span upon elongated fibers is within the scope of this disclosure. Some of such other variants of example configurations that permit in-situ placement are described following.

Figure 5:
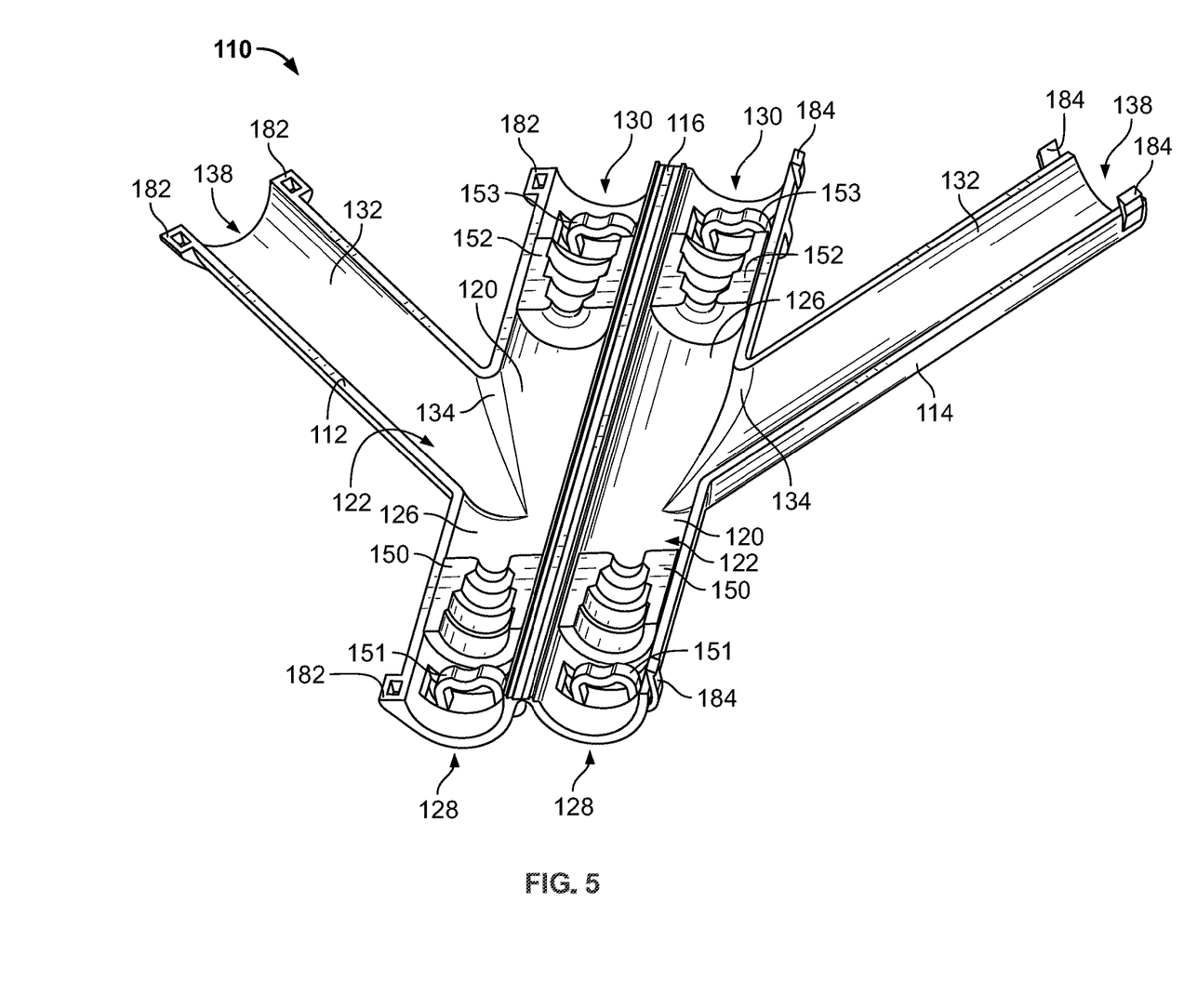
FIG. 5 is a perspective view illustration of a second example of a breakout device for mid-span fiber separation, with the device being in a first, undeployed or unmated (e.g., open) position or configuration, according to some embodiments.

Referring to FIG. 5, another example of a breakout device 110 for mid-span fiber separation is shown. It is to be noted that the device 110 is shown in a first, undeployed position within FIG. 5. The example device 110 has a clamshell configuration. Specifically, the example device 110 has a first half 112 and a second half 114. The first and second halves 112, 114 are portions of the device 112. The first and second halves 112, 114 are connected to each other via a hinge 116. Within the shown example the hinge 116 is provided by a single flexible hinge segment extending along at least a majority of the length of the first and second halves 112, 114. Of course, a different hinge construction is contemplated and within the scope of this disclosure.

Within one or more examples, the device 110 is made of hard plastic, with the hinge 116 being sufficiently thin to permit a hinge movement (e.g., folding) thereat. Of course, different materials, and combinations of materials are contemplated.

The first half 112 has a general "Y" shape. Note that the "Y" shape is different from the "Y" shape of the example shown within FIGS. 1-4. Specifically, recall that the "Y" shape of the example shown within FIGS. 1-4 has arcuate surfaces that provides a curving shape. In distinction, the "Y" shape shown within FIG. 5 includes a discrete angular change.

The first half 112 includes a wall 120 that separates a hollow interior 122 from an exterior of the first half. The wall 120 is shaped such that the wall is concave toward the hollow interior 122 and convex toward the exterior of the first half 112.

The first half 112 has a primary wall segment 126 that extends along a generally linear direction with a first open end 128 of the wall 120 and a second open end 130 of the wall located at opposite ends of the primary wall segment 126. The first half 112 has a secondary wall segment 132 that junctions from the primary wall segment 126 at a junction location (or simply a "junction") 134 that is partially along the extent of the primary wall segment between the first and second open ends 128, 130. The secondary wall segment 132 extends linearly away from the primary wall segment 126 at an angle.

Focusing upon the first open end 128 of the wall 120, such first open end is intended to receive a fiber cable, with fibers, similar to the example shown in FIG. 3. It is to be appreciated that such cable contains a plurality of elongate fibers. It is to be appreciated that the cable may be the same/similar to the example discussed above in connection with FIG. 3. It is to be appreciated that fibers of the cable may be separated in a manner that is the same/similar to the example discussed above in connection with FIG. 3. Also, it is to be appreciated that cable and its fiber may be prepared, handled, etc. in a manner that is the same/similar to the example discussed above in connection with FIG. 3.

Focusing again on FIG. 5 note that the shown example includes structure(s) at/near the first open end 128 of the wall 120 that is/are associated with reception of the fiber cable therein. Within the shown example such structure includes a reducer 150 to help hold, retain, align, or the like the fiber cable, or fibers, received within the first open end 128. The example reducer 150 is a thicken wall portion that reduces an interior diameter of the hollow interior space 122 and thus reduces the interior hollow space diameter at the reducer. Within the shown example, the reducer 150 is a stepped-down reducer, which includes a plurality of different thickness to provide a plurality of different reductions of interior diameter of the hollow interior space 122 and thus different reductions of the interior hollow space at each respective different thickness. Such a stepped-down reducer 150 helps to accommodate a range of different diameters that can be associated with different cables.

Note also that the shown example includes structure(s) at/near the first open end 128 of the wall 120 to help retain the cable/fibers. Within the shown example, the shown structures include a bias member 151 that extends partially into the hollow interior 122 and that can resiliently engage against the cable/fibers.

The second open end 30 may include a stepped-down reducer 152 that is similar to the stepped-down reducer 150, and a bias member 153 similar to the bias member 151. Within the shown example, the third open end 138 does not include structure such as stepped-down reducer or a bias member. Of course, variations are contemplated and within the scope of the present disclosure.

At this point, it is to be noted that the second half 114 (e.g., the second clamshell half) includes similar, albeit mirror image, structures concerning the wall 120 concave toward the hollow interior 122, the primary wall segment 126, the secondary wall segment 132 that extends from the junction 134, the first-third open ends 128, 130 and 138, structures at the first-third open ends, and the respective shapes, configurations, locations etc. Hereinafter, discussions regarding at least the structures mentioned above are to be considered to apply to both the first and second halves 112 and 114 (e.g., the first and second clamshell halves). At this point, it is to be noted that there are some different structures that are present on the first and second halves 112, 114, with these different structures being discussed further following.

Recall that the example of FIG. 5 is similar to the example of FIGS. 1-4 in that fibers are separated (e.g., the first and second subsets of fibers) within the device 110. All of the fibers may enter through the first open end 128. Some of the fibers (e.g., the first subset of fibers) extend along the primary wall segment 126 that extends along a generally linear direction from the first open end 128 to and through the second open end 130. As such, the first subset of fibers is provided with a primary interior pathway in the hollow interior 122 between the first and second open ends 128, 130. Recall that each of the first and second halves 112, 114 provides a portion of the overall hollow interior 122. As such, each of the first and second halves 112, 114 provides a part (e.g., first and second parts) of the primary interior pathway. As can be appreciated, once the two halves 112, 114 are closed to mate together (e.g., deployed) the two parts (e.g., first and second parts) of the primary interior pathway are together to provide the primary interior pathway and the first subset of fibers extend along the primary interior pathway. As such, the primary wall segments 126 of the first and second halves 112, 114 bound the primary interior pathway when the two halves 112, 114 are closed (e.g., deployed).

Recall that the second subset of fibers is to extend along the secondary wall segment 132, via the direction at the junction 134, to extend toward and through the third open end 138. As such, the second subset of fibers is provided with a secondary interior pathway in the hollow interior 122 between the first and third open ends 128, 138. Recall that each of the first and second halves 112, 114 provides a portion of the overall hollow interior 122. As such, each of the first and second halves 112, 114 provides a part (e.g., first and second parts) of the secondary interior pathway. As can be appreciated, once the two halves 112, 114 are closed (e.g., deployed) the two parts (e.g., first and second parts) of the secondary interior pathway are together to provide the secondary interior pathway and the second subset of fibers extend along the secondary interior pathway. As such, an initial portion (e.g., near the first open end 128) of the primary wall segments 126 and the secondary wall segments 132 bound the secondary interior pathway when the two halves 112, 114 are closed (e.g., deployed).

It is to be appreciated that with fibers in place and with the two halves 112, 114 closed to mate together (e.g., deployed), the first open end 128 provide a first, entrance orifice into the device 110 at an entrance to the primary interior pathway for all of the fibers, the second open ends 130 provides a second, exit orifice from the connector at an exit from the primary interior pathway and the third open end 138 provide a third, exit orifice from the connector at an exit from the secondary interior pathway. The second open end 130, e.g., the second, exit orifice, is for one portion of the fibers to exit and the third open end 138, e.g., the third, exit orifice, is for the other portion of the fibers to exit. Also, because the fibers are not cut/spliced for the purpose of placing the fibers into the device 110 and deploying the device onto the fibers, the placement is in-situ (e.g., in place) placement of the device onto the fibers to accomplish the separation and protection of the separated fibers. The in-situ placement is without a need of cutting/splicing the fibers. Recall that the fibers have an elongation span and the placement of the device is at a mid-span location of the fibers. With the in-situ placement of the device, all fibers extend through the first, entrance orifice at the entrance to the primary interior pathway, a first group of fibers extend through the second, exit orifice from the connector at the exit from the primary interior pathway and a second, separate group of fibers extending through the third, exit orifice from the connector at the exit from the secondary interior pathway.

It is worth noting that the clamshell construction (e.g., first and second halves 112, 114 connected via the hinge 116) of the device 110 is an example configuration that permits the in-situ placement of the device upon elongated fibers. The first and second halves 112, 114 mate together such that the interior space 122 is enclosed and the primary and secondary interior pathways are thereby bounded. Of course, it is contemplated and thus to be understood that other variants of example configurations that permit in-situ placement of the device upon elongated fibers is within the scope of this disclosure.

The device 110 may include one or more closure retainers. Within the shown example, each closure retainer is a snap clasp that includes a receptacle on one of the device halves and a mating clasp projection on the other half. Within the shown example, four snap clasps are shown, with a first located adjacent to the first open end 128, a second located adjacent to the second open end 130, and the third and fourth located adjacent to the third open end 138.

For each snap clasp, note that the example includes a portion located on the first half 112 that bounds a receptacle 182, and includes barbed projection 184 on the second half 114. When the device 10 is closed (e.g., the hinge 116 is flexed to bring the two halves 112, 114 together), the projection 184 enters the respective receptacle 182. Within the receptacle 182, a barb on the projection 184 is slightly squeezed. Once the projection 184 is moved into the receptacle 182 a sufficient amount, the barb on the projection 184 is moved to point in which the barb moves past the portion bounding the receptacle 182 and "snaps" out to an unsqueezed condition. The barb helps hold the projection 184 in the receptacle 82 and thus helps hold the device 110 in the closed position.

It is to be appreciated that optional structures, material, wrap, etc. may be applied to the cable and/or the device 110 at/adjacent to one or more of the open ends 128, 130 and 138. Examples of such include closed-sell foam and shrink wrap. The use if such may help retain the cable/fibers relative to the device 110. Also, the use of such may help protect the cable/fibers and/or the device 110.

Figure 6:
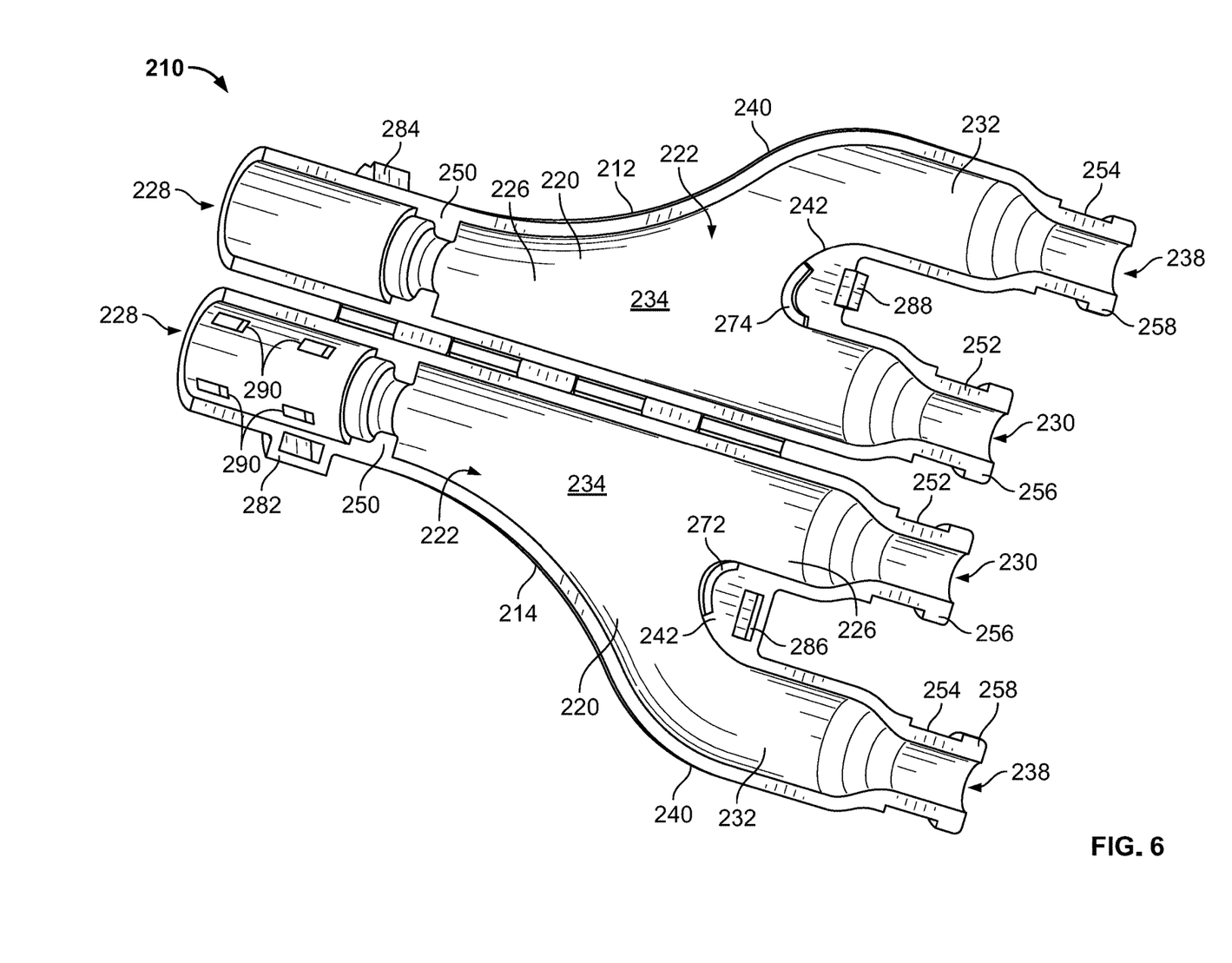
FIG. 6 is a perspective view illustration of a third example of a breakout device for mid-span fiber separation, with the device being in a first, undeployed or unmated (e.g., open) position or configuration, according to some embodiments.

Referring to FIG. 6, another example of a breakout device 210 for in-situ mid-span fiber separation is shown. It is to be noted that the device 210 is shown in a first, undeployed position within FIG. 6. The example device 210 has a two-piece configuration. Specifically, the example device 210 has a first half 212 and a second half 214 that are separate pieces in the undeployed (e.g., open) condition. The first and second halves 212, 214 are not connected to each other via a hinge, in distinction from the previous examples of FIGS. 1-5. The first and second halves 212, 214 are separate, freestanding items from each other. The first and second halves 212, 214 are portions of the device 210.

Within one or more examples, the device 210 is made of hard plastic. Of course, different materials, and combinations of materials are contemplated.

Other than the absence of a hinge, the device 210 has the same/similar structures, functions and operations as the device 10 shown on FIGS. 1-4. For such structures, the structures are identified within FIG. 6 within reference numerals that are three-digit numerals with a "2" prefix and two-digit suffixes that are the same as the two-digit numerals used within FIGS. 1-4. Specifically, see the following structures in FIG. 6: wall 220, hollow interior 222, primary wall segment 226, first open end 228, second open end 230, secondary wall segment 232, junction 234, third open end 238, arcuate portion 240, portion 242, reducer 250, reduced diameter wall portion 252, reduced diameter wall portion 254, thickened wall portion 256, thickened wall portion 258, tab projection 272, complementary receptacle 274, receptacle 282, projection 284, receptacle 286, projection 288, and tie receptacles 290. These structures, e.g., identified via the three-digit numerals, have constructions, configurations and functions that are the same/similar to the constructions, configurations and functions of the corresponding, respective structures that are identified via the two-digit numbers within FIGS. 1-4. All of the associated discussions presented in connection with FIGS. 1-4 are incorporated hereat and to be applied to the example device 210 shown in FIG. 6 (of course with an understanding that the two-digit numerals are to be replaced with the three-digit numerals).

It is worth noting that the two-piece construction (e.g., first and second halves 212, 214) of the device 210 is an example configuration that permits the in-situ placement of the device upon elongated fibers. The first and second halves 212, 214 mate together such that the interior space 222 is enclosed and the primary and secondary interior pathways are thereby bounded. As such, the device 210 of FIG. 6 provides another example configuration of first and second portions that permit in-situ placement upon elongated fibers.

Figure 7:
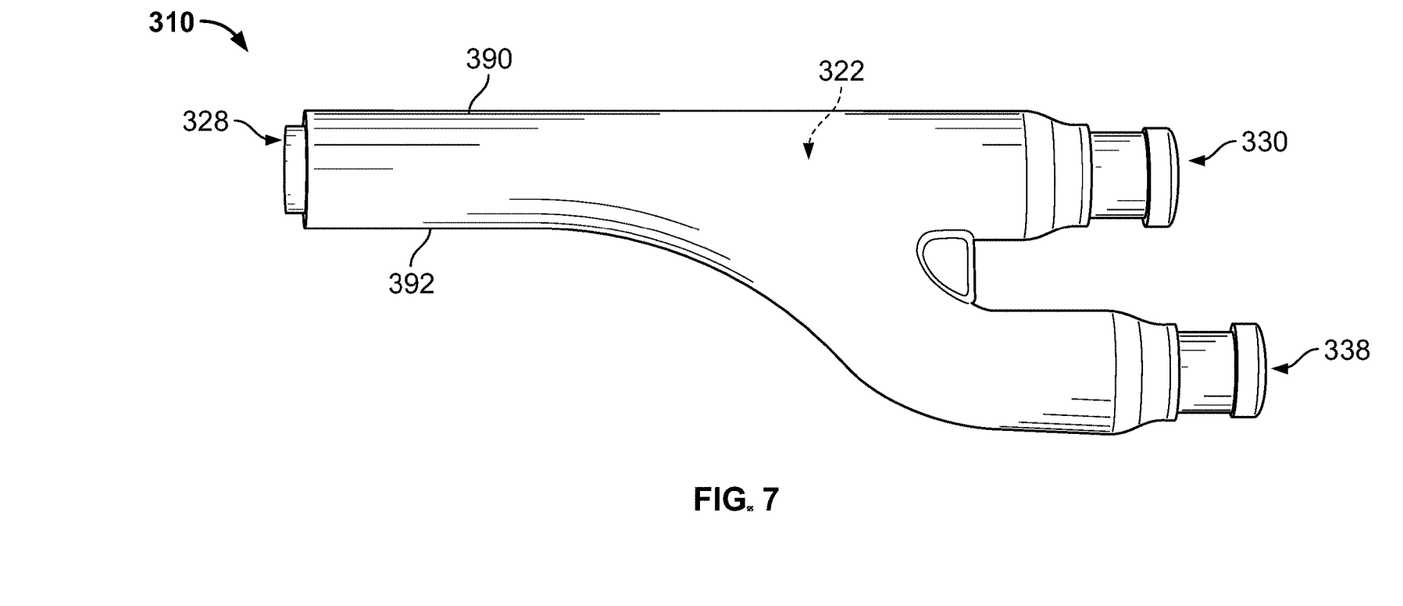
FIG. 7 is an illustration of a fourth example of a breakout device for mid-span fiber separation, according to some embodiments.
Figure 8:
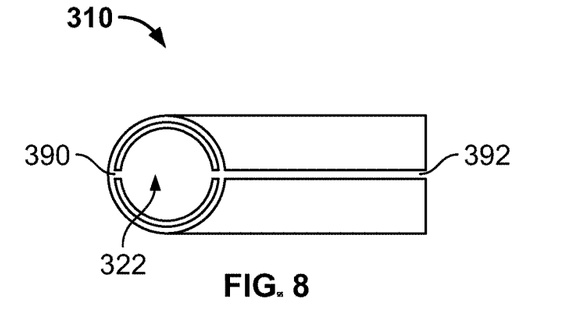
FIG. 8 is an end view of the fourth example device, according to some embodiments.

Referring to FIGS. 7 and 8, another example of a breakout device 310 for in-situ mid-span fiber separation is shown. The example device 310 has a one-piece configuration. Specifically, the example device 310 does not have first and second separable halves as presented for the examples in FIGS. 1-6. Instead, the example device 310 (FIGS. 7 and 8) includes slits or slots 390, 392 that extend along outer edges of the "Y" shape. The slots 390, 392 allow a cable, and more specifically fibers to be slid into a hollow interior 322 (note, hollow interior is internal and hidden in FIG. 7) through the slots. As such, the slot 390 is a first access for in-situ, mid-span fiber placement into the device 310, and the slot 392 is a second access for in-situ, mid-span fiber placement into the device 310.

Although the device 310 is one-piece, there are first and second portions of the device 10. The first portion has the hollow interior space 322 defining a first part of a primary interior pathway and defining a first part of a secondary interior pathway that branches away from the primary interior pathway. The second portion has the hollow interior space 322 defining a second part of the primary interior pathway and defining a second part of the secondary interior pathway. The first and second portions together bound the primary interior pathway and bound the secondary interior pathway. The first and second portions together define a first, entrance orifice, at a first open end 328, into the device 310 at an entrance to the primary interior pathway, a second, exit orifice, at a second open end 330, from the device at an exit from the primary interior pathway and a third, exit orifice, at a third open end 338, from the device at an exit from the secondary interior pathway.

A first subset of fibers may be slid in, at slot 390, from one side so that the fibers extend from the first open end 328 to the second open end 330. A second subset of fibers may be slid in, at slot 392, from the other side so that the fibers extend from the first open end 328 to the third open end 338. It is to be noted, once the fibers are placed into the device 310 via use of the slots 390, 392, all fibers enter the device 310 at a first, entrance orifice provided via the first open end 328, a first group of the fibers exit the device at a second, exit orifice provided via the second open end 330 and a second, group of fibers exit the device at a third, exit orifice provided via the third open end 338.

Other than being one-piece and thus not needing a hinge, closure retainers, etc. associated with the above-described clamshell or two-piece (e.g., two freestanding pieces) examples, the device 310 may have some same/similar structures, functions, operation as the above-described devices shown on FIGS. 1-6. As such, some of the above discussions regarding same/similar structures, functions, operation as the above-described devices are applicable to the example shown in in FIGS. 7 and 8 and such discussions are incorporated hereat.

It is worth noting that the one-piece construction, with slits 390, 392, of the device 210 is an example configuration that permits the in-situ placement of the device upon elongated fibers. No cutting/splicing of the fibers need occur, so cutting/splicing may be avoided. The interior space 322 is defined and bounded therein and the primary and secondary interior pathways are thereby bounded.

Within one or more examples, the device 310 is made of hard plastic. Of course, different materials, and combinations of materials are contemplated. Also, some different accompanying structures, materials could be used within the Example device 310 of FIGS. 7 and 8. For example, once the fibers are separated with a group being slid into the hollow interior from each of the two sides as discussed above, tape/wrap/ties could be applied to retain/hold the fibers and prevent the fibers from exiting out through the slots.

Figure 9:
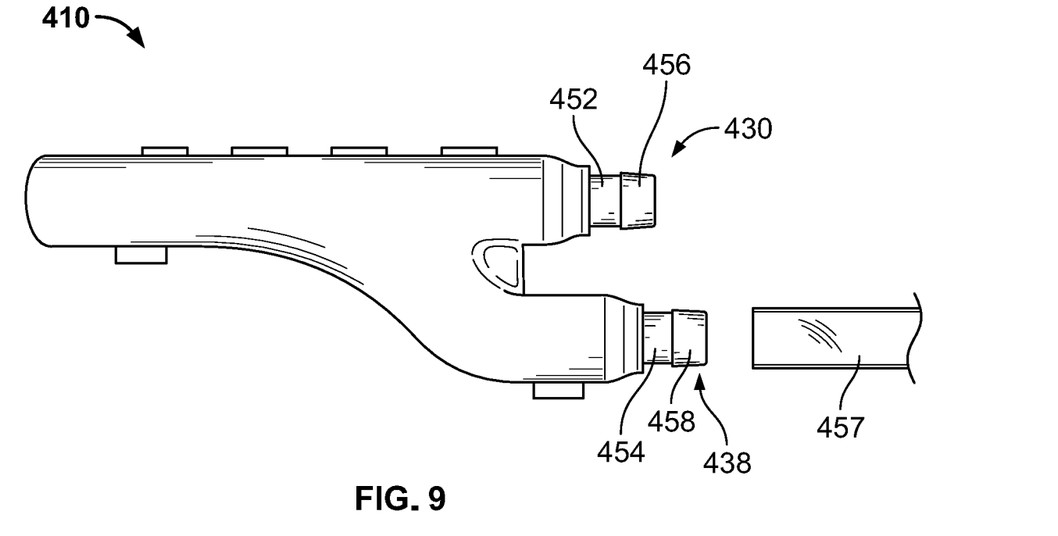
FIG. 9 is an illustration of a partially schematized, generic example breakout device for mid-span fiber separation adjacent to an example covering for exiting fibers, according to some embodiments.
Figure 10:
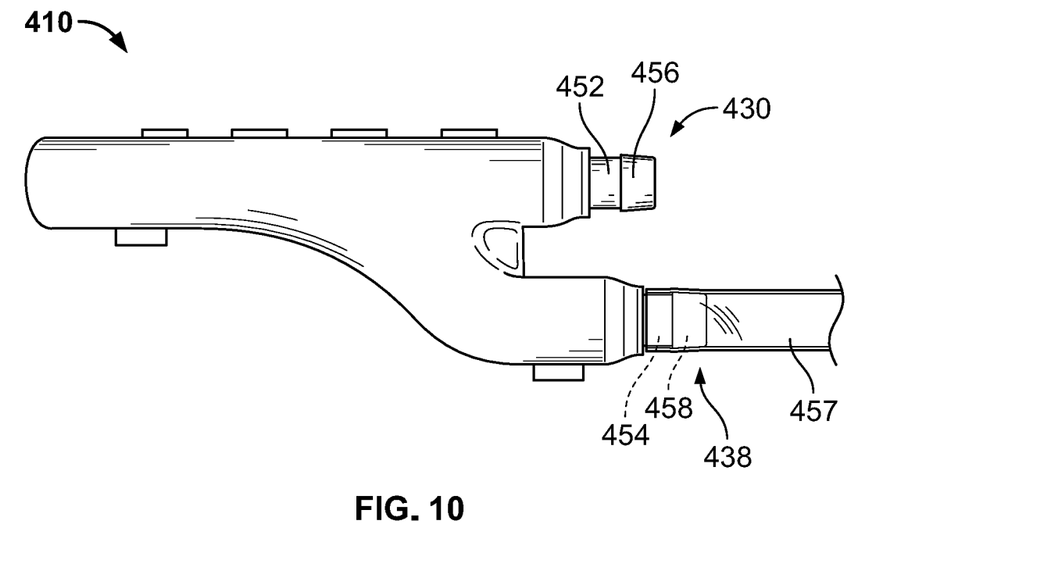
FIG. 10 is an illustration similar to FIG. 9 with the example covering contacted with the example breakout device, according to some embodiments.

Recall that subsets of fibers 48A, 48B may be covered for protection (e.g., from injury, dirt, etc.) once the subsets of fibers exit the device (e.g., 10, 110, 210 or 310). Recall that FIG. 4 provided an example of such covering that is a cloth shroud. It is to be appreciated variations of such covering for the exiting subsets of fibers 48A, 48B is contemplated and within the scope of the present disclosure. FIGS. 9 and 10 provide another example variant covering. The shown example variant of FIGS. 9 and 10 is plastic tubing 457.

It is to be appreciated that the variants of fiber subset covering, for example, the plastic tubing 457 of FIGS. 9 and 10, may be utilized with some or all of the devices (e.g., 10, 110, 210 and 310) presented within the present disclosure. As such, the device 410 shown within FIGS. 9 and 10 is presented as a partially schematized, generic representation of all of the devices 10, 110, 210 and 310 (i.e., the device 410 shown within FIGS. 9 and 10 is to be considered to represent any of the devices 10, 110, 210 and 310). As such, some of the structures presented for the devices 10, 110, 210 and 310 are schematized and/or made generic within the representative device 410 shown within FIGS. 9 and 10.

The variants of fiber subset covering, for example, the plastic tubing 457 of FIGS. 9 and 10, may also be associated within a modification of one or both of the second and third open ends. Within the shown example of FIGS. 9 and 10, note that second and third open ends 430 and 438 have constructions/configurations that are commentary to the use of the plastic tubing 457. Within the shown example, each of such open ends 430, 438 is associated a reduced diameter wall portion 452, 454, respectively, and a thickened wall portion 456, 458, respectively, at each respective distal end. The thickened wall portion 456, 458 is tapered to be thinner toward a distal end. Such tapering allows for easier insertion into the plastic tubing 457. A portion of the plastic tubing 457 may temporarily, elastically stretch to increase an internal diameter of the plastic tubing during such insertion. Such, stretching permits reception of the thickened, but tapered, wall portion (e.g., 456, 458). A portion of the stretched plastic tubing 457 may return toward an original interior diameter once the reduced diameter wall portion (e.g., 452, 454) is reached. Such, may help retain the plastic tubing upon the open end (e.g., 430, 438). Of course, a zip-tie or similar device may be applied over the plastic tubing 457 at the location of the reduced diameter wall portion (e.g., 452, 454) to aid in retention.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A breakout device for mid-span fiber separation, the device comprising:

a first portion having an interior space defining a first part of a primary interior pathway and defining a first part of a secondary interior pathway that branches away from the primary interior pathway; and a second portion having an interior space defining a second part of the primary interior pathway and defining a second part of the secondary interior pathway, wherein;

the first portion and the second portion together bound the primary interior pathway and bound the secondary interior pathway, and the first portion and the second portion together define a first entrance orifice into the device at an entrance to the primary interior pathway, a second exit orifice from the device at an exit from the primary interior pathway and a third exit orifice from the device at an exit from the secondary interior pathway, and the first portion and the second portion are configured to permit in-situ placement of the device upon elongated fibers at a mid-span location of the fibers, with the fibers extending through the first entrance orifice at the entrance to the primary interior pathway, a first group of the fibers extending through the second exit orifice at the exit from the primary interior pathway, and a second group of the fibers extending through the third exit orifice at the exit from the secondary interior pathway;

wherein the first portion and the second portion include one or more walls that separate the respective hollow interior space from an exterior outside of the device, each wall of the first portion and the second portion including a primary wall segment bounding the second part of the primary interior pathway and a secondary wall segment bounding the second part of the secondary interior pathway, the primary wall segment including a reduced diameter wall portion and a collar to receive and retain a protective shrouding for the first group of the fibers extending through the second exit orifice at the exit from the primary interior pathway, and the secondary wall segment including a reduced diameter wall portion and a collar to receive and retain a protective shrouding for the second group of the fibers extending through the third exit orifice at the exit from the secondary interior pathway.

2. The device as set forth in claim 1, wherein the primary wall segment includes a distal end, the secondary wall segment includes a distal end, and each collar includes a thickened wall portion at each respective distal end.

3. The device as set forth in claim 1, wherein each reduced diameter wall portion receives a tightened tie and each collar retains the tie within the respective reduced diameter wall portion.

4. The device as set forth in claim 2, wherein each thickened wall portion is tapered to be thinner toward a respective distal end.

5. The device as set forth in claim 4, wherein the tapered wall portion permits insertion into a plastic tubing.

6. The device as set forth in claim 1, wherein the first portion is a first half of the device and the second portion is a second half of the device, the first half is movable relative to the second half between an open condition and a closed condition, in the closed condition the first half and the second half are mated-together such that the interior space of the first half and the interior space of the second half is enclosed and the primary interior pathway and the secondary interior pathway are thereby bounded.

7. The device as set forth in claim 6, wherein the device comprises an anti-pinch configuration to guide the fibers away from a pinch condition between the first half and the second half as the first half is moved relative to the second half to the closed condition, the anti-pinch configuration includes a tab extending from the first half and extending outside of the interior space of the first half and a receptacle, within the second half, receiving the tab when the first half and the second half are relatively moved to the closed condition.

8. The device as set forth in claim 1, wherein the first portion is part of a non-separable, unitary member, and the second portion is another part of the non-separable, unitary member.

9. The device as set forth in claim 8, wherein the non-separable, unitary member has a first slot and a second slot, the first slot extends from an exterior of the device to the interior space of at least one of the first portion or the second portion and extends along an extent of the primary interior pathway between the first entrance orifice and the second exit orifice to permit the first group of the fibers at the mid-span location to be placed in-situ through the first slot into the interior space of at least one of the first portion or the second portion to to extend along the primary interior pathway, and the second slot extends from the exterior of the device into the interior space of at least one of the first portion or the second portion and extends along a portion of the extent of the primary interior pathway and the secondary interior pathway between the first entrance orifice and the third exit orifice to permit the second group of the fibers at the mid-span location to be placed in-situ through the second slot into the interior space of at least one of the first portion or the second portion to extend partially along the primary interior pathway and along the secondary interior pathway.

10. A breakout device for mid-span fiber separation, the device comprising:
a first portion having an interior space defining a first part of a primary interior pathway and defining a first part of a secondary interior pathway that branches away from the primary interior pathway; and
a second portion having an interior space defining a second part of the primary interior pathway and defining a second part of the secondary interior pathway;
wherein the first portion is movable relative to the second portion between an open condition and a closed condition, in the closed condition the first portion and the second portion are mated-together such that the interior space of the first portion and the interior space of the second portion is enclosed and the primary interior pathway and the secondary interior pathway are thereby bounded, the first portion and the second portion together defining a first entrance orifice into the device at an entrance to the primary interior pathway, a second exit orifice from the device at an exit from the primary interior pathway and a third exit orifice from the device at an exit from the secondary interior pathway, the first portion and the second portion being configured to permit in-situ placement of the device upon elongated fibers at a mid-span location of the fibers, with the fibers extending through the first entrance orifice at the entrance to the primary interior pathway, a first group of the fibers extending through the second exit orifice at the exit from the primary interior pathway, and a second group of the fibers extending through the third exit orifice at the exit from the secondary interior pathway, and wherein the device comprises an anti-pinch configuration to guide the fibers away from a pinch condition between the first portion and the second portion as the first portion is moved relative to the second portion to the closed condition, the anti-pinch configuration including a tab extending from the first portion and extending outside of the interior space of the first portion and a receptacle, within the second portion, receiving the tab when the first portion and the second portion are relatively moved to the closed condition.

11. The device as set forth in claim 10, wherein the first portion and the second portion each include one or more walls, the one or morewalls each including a reduced diameter wall portion and a collar to receive and retain a protective shrouding for the first group of the fibers extending through the second exit orifice at the exit from the primary interior pathway and a reduced diameter wall portion and a collar to receive and retain a protective shrouding for the second group of the fibers extending through the third exit orifice at the exit from the secondary interior pathway.

12. The device as set forth in claim 11, wherein each collar is provided as a thickened wall portion at respective distal ends of the one or more walls.

13. The device as set forth in claim 11, wherein each reduced diameter wall portion receives a tightened tie and each collar retains the tie within the respective reduced diameter wall portion.

14. The device as set forth in claim 12, wherein each thickened wall portion is tapered to be thinner toward a respective distal end.

15. The device as set forth in claim 14, wherein the tapered wall portion permits insertion into a plastic tubing.

16. A breakout device for mid-span fiber separation, the device comprising:
- a first portion of a non-separable, unitary member, the first portion having an interior space defining a first part of a primary interior pathway and defining a first part of a secondary interior pathway that branches away from the primary interior pathway; and
- a second portion of the non-separable, unitary member, the second portion having an interior space defining a second part of the primary interior pathway and defining a second part of the secondary interior pathway, wherein;
- the first portion and the second portion together bound the primary interior pathway and bound the secondary interior pathway, and the first portion and the second portion together define a first entrance orifice into the device at an entrance to the primary interior pathway, a second exit orifice from the device at an exit from the primary interior pathway and a third exit orifice from the device at an exit from the secondary interior pathway, and
- the non-separable, unitary member having a first slot and a second slot to permit in-situ placement of the device upon elongated fibers at a mid-span location of the fibers, with the fibers extending through the first entrance orifice at the entrance to the primary interior pathway, a first group of the fibers extending through the second exit orifice at the exit from the primary interior pathway, and a second group of the fibers extending through the third exit orifice at the exit from the secondary interior pathway, wherein the first slot extends from an exterior of the device into the interior space of at least one of the first portion or the second portion and extends along an extent of the primary interior pathway between the first entrance orifice and the second exit orifice to permit the first group of the fibers at the mid-span location to be placed in-situ through the first slot into the interior space of at least one of the first portion or the second portion to extend along the primary interior pathway, and the second slot extends from the exterior of the device into the interior space of at least one of the first portion or the second portion and extends along a portion of the extent of the primary interior pathway and the secondary interior pathway between the first entrance orifice and the third exit orifice to permit the second group of the fibers at the mid-span location to be placed in-situ through the second slot into the interior space to extend partially along the primary interior pathway and along the secondary interior pathway.

17. The device as set forth in claim 16, wherein the non-separable, unitary member includes one or more walls, the one or more walls each include a reduced diameter wall portion and a collar to receive and retain a protective shrouding for the first group of the fibers extending through the second exit orifice at the exit from the primary interior pathway and a reduced diameter wall portion and a collar to receive and retain a protective shrouding for the second group of the fibers extending through the third exit orifice at the exit from the secondary interior pathway.

18. The device as set forth in claim 17, wherein each collar is provided as a thickened wall portion at respective distal ends of the one or more walls.

19. The device as set forth in claim 17, wherein each reduced diameter wall portion receives a tightened tie and each collar retains the tie within the respective reduced diameter wall portion.

20. The device as set forth in claim 18, wherein each thickened wall portion is tapered to be thinner toward a respective distal end.

\* \* \* \* \*